Dec. 7, 1965 H. P. WHITE 3,222,000
COIL WINDING APPARATUS
Filed May 7, 1962 5 Sheets-Sheet 1

INVENTOR.
HOWARD P. WHITE
BY
*Carl Fissell Jr.*
AGENT

Dec. 7, 1965  H. P. WHITE  3,222,000
COIL WINDING APPARATUS
Filed May 7, 1962  5 Sheets-Sheet 2
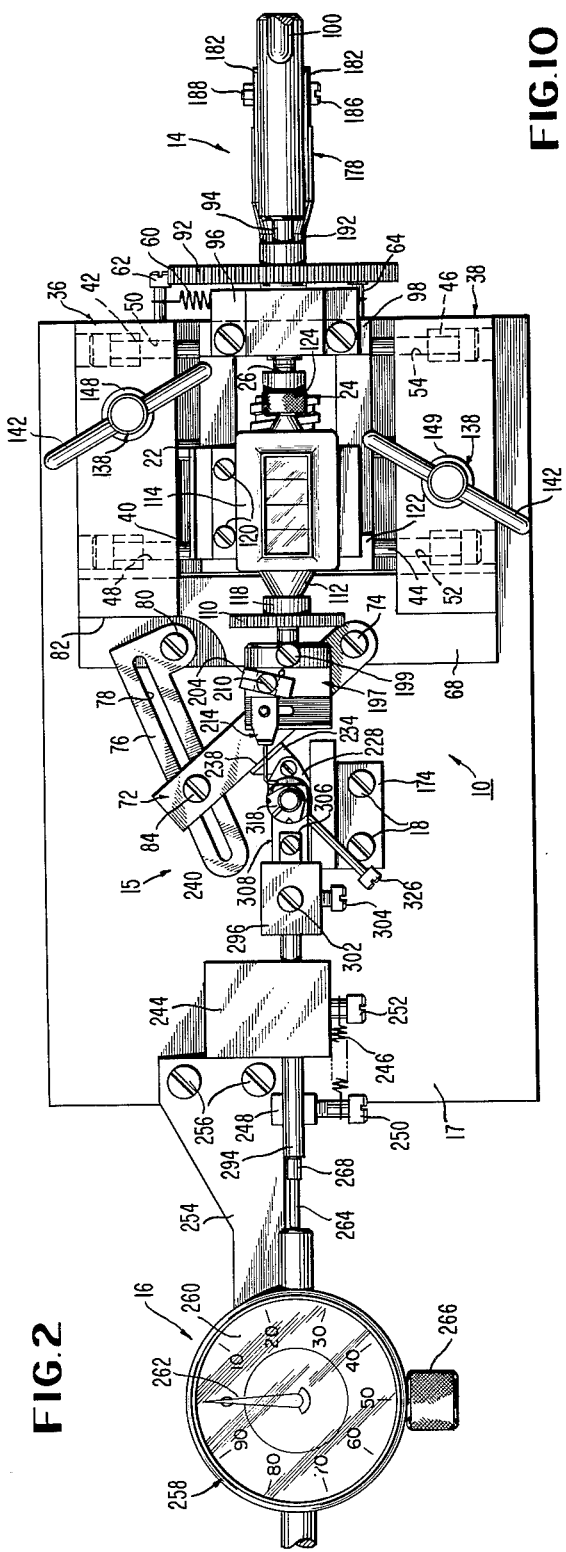
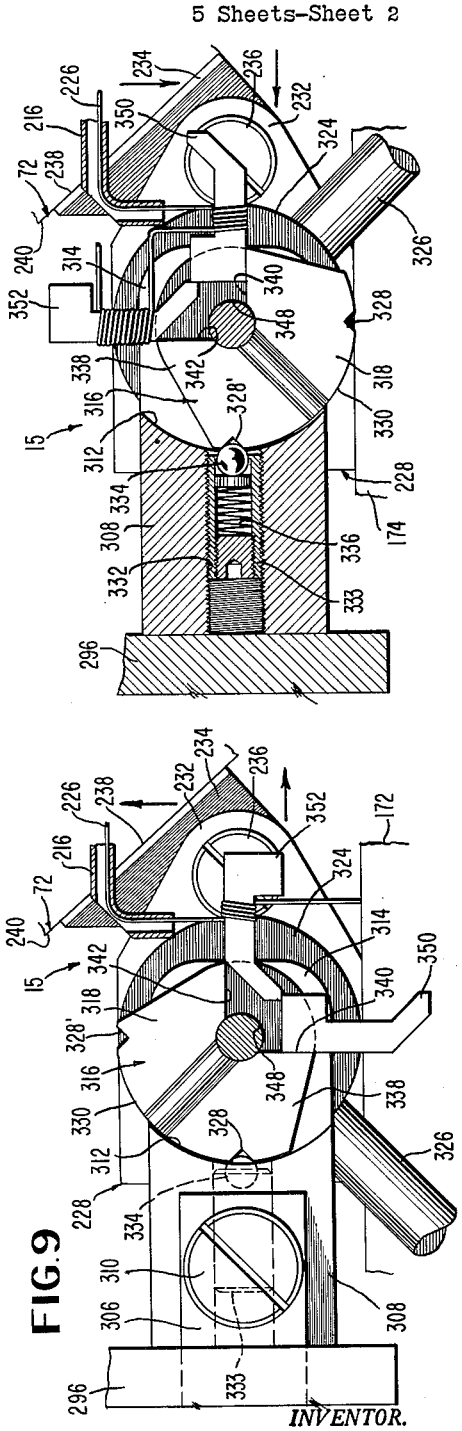
INVENTOR.
HOWARD P. WHITE
BY
Carl Fissell Jr.
AGENT Dec. 7, 1965  H. P. WHITE  3,222,000
COIL WINDING APPARATUS
Filed May 7, 1962   5 Sheets-Sheet 3
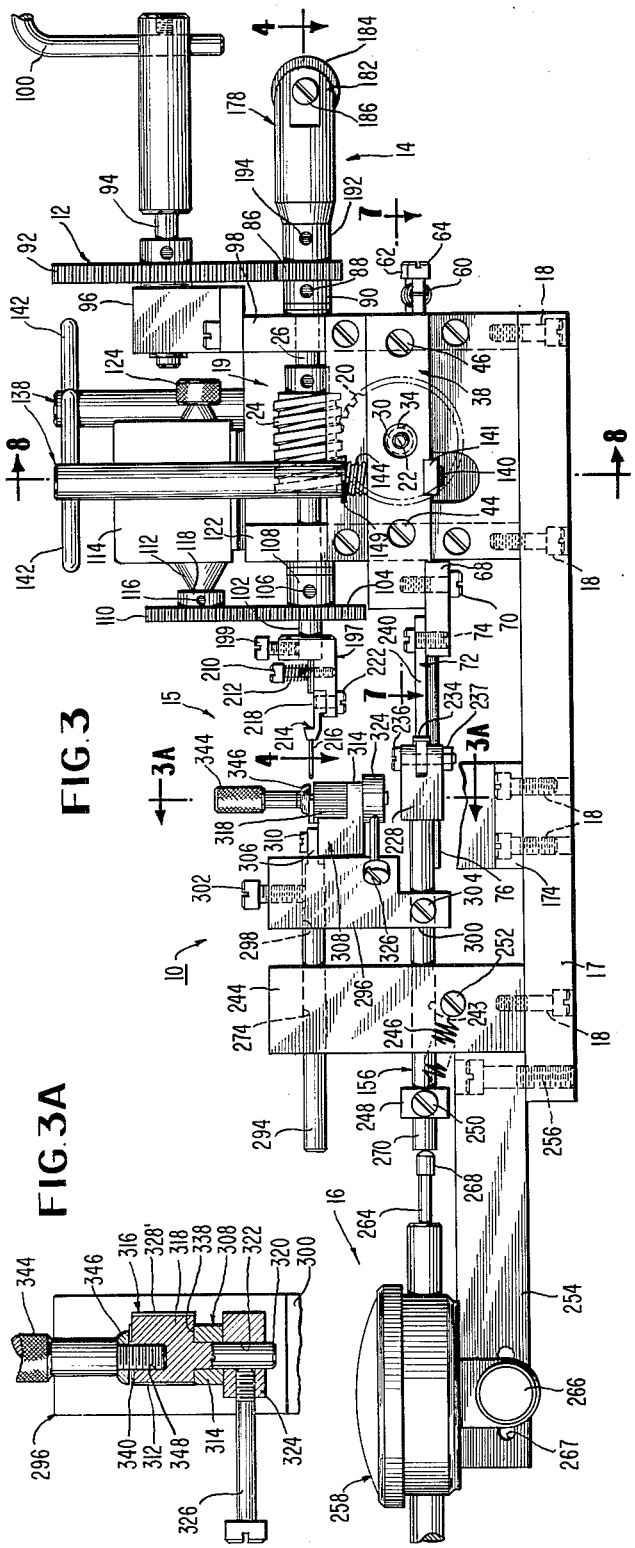
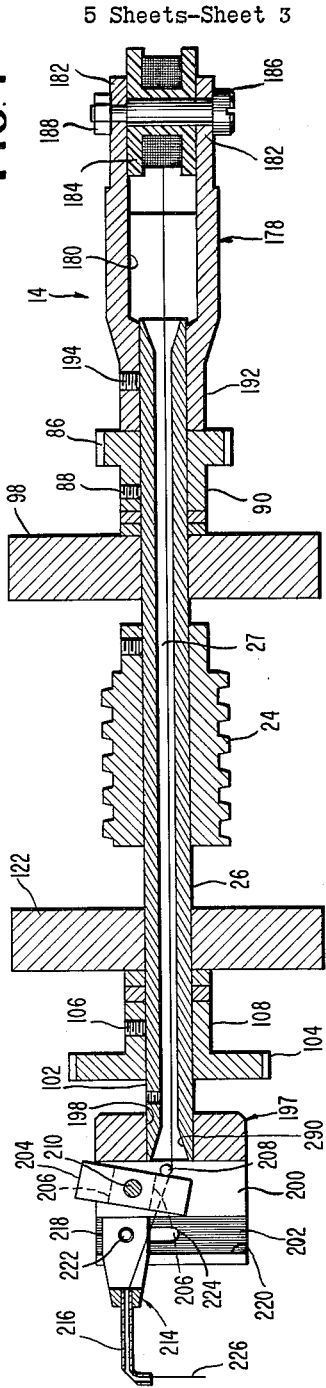
INVENTOR.
HOWARD P. WHITE
BY
Carl Fissell Jr.
AGENT Dec. 7, 1965 H. P. WHITE 3,222,000
COIL WINDING APPARATUS
Filed May 7, 1962 5 Sheets-Sheet 4
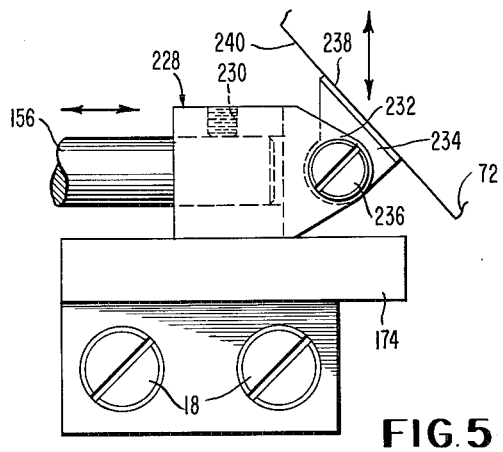
FIG.5
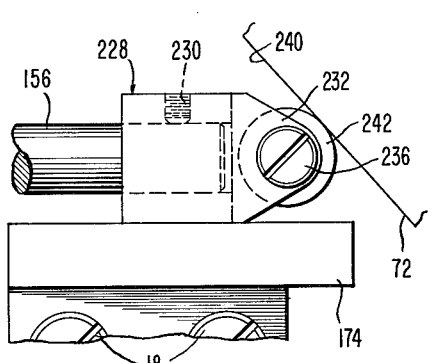
FIG.6
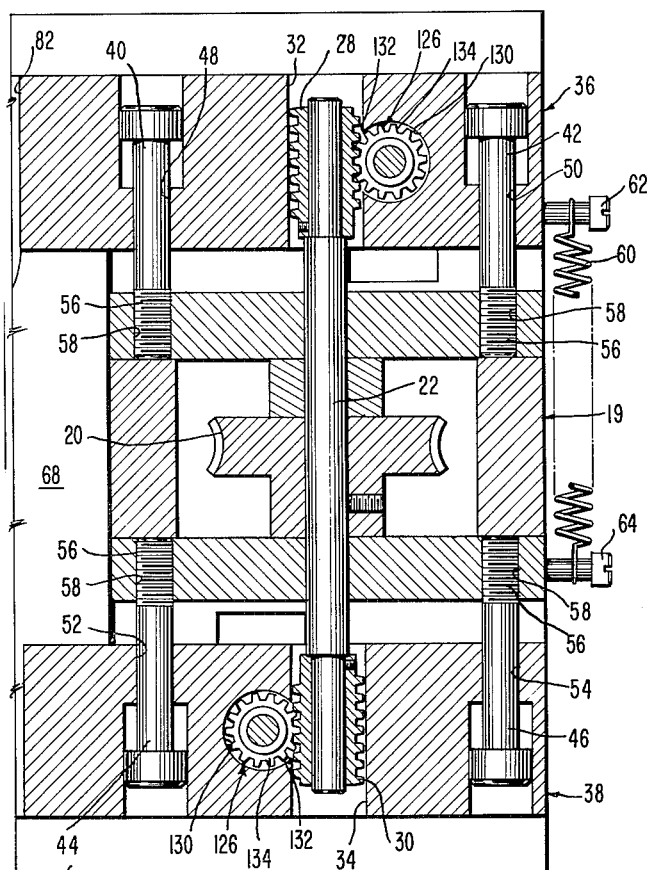
FIG.7
FIG.8
INVENTOR.
HOWARD P. WHITE
BY
*Carl Fissell Jr.*
AGENT

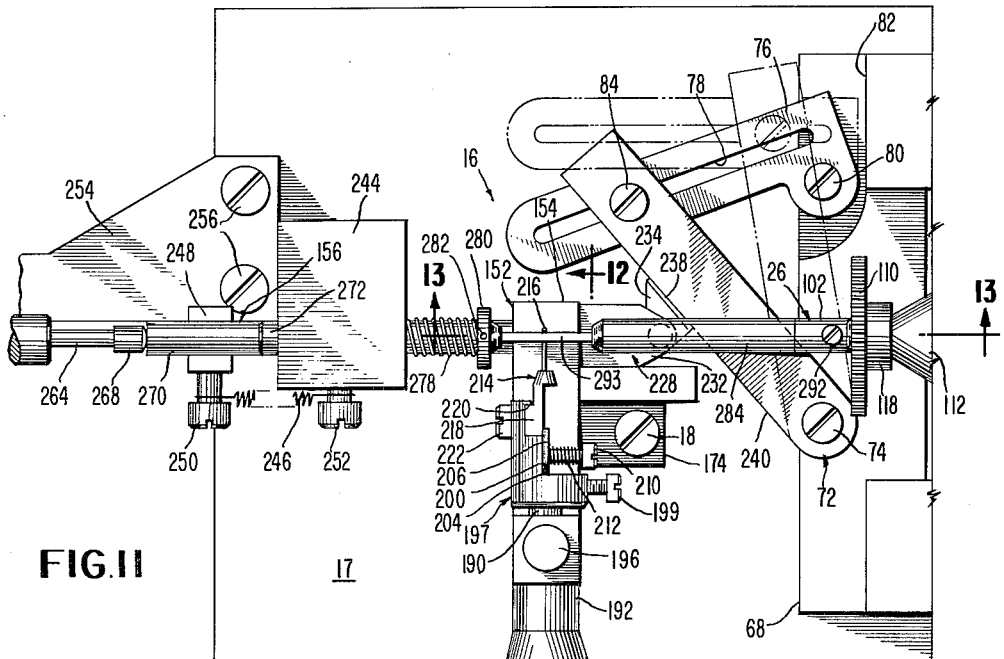
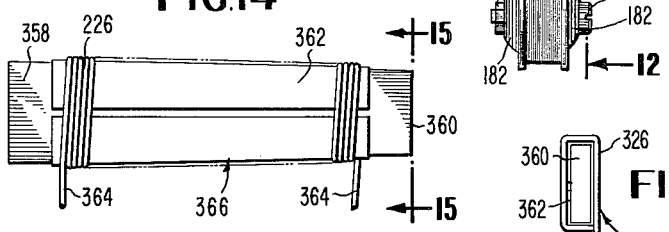
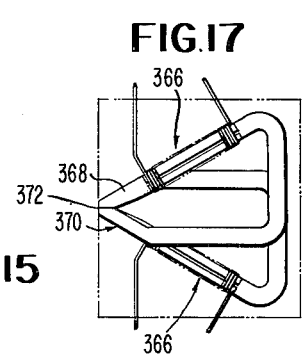
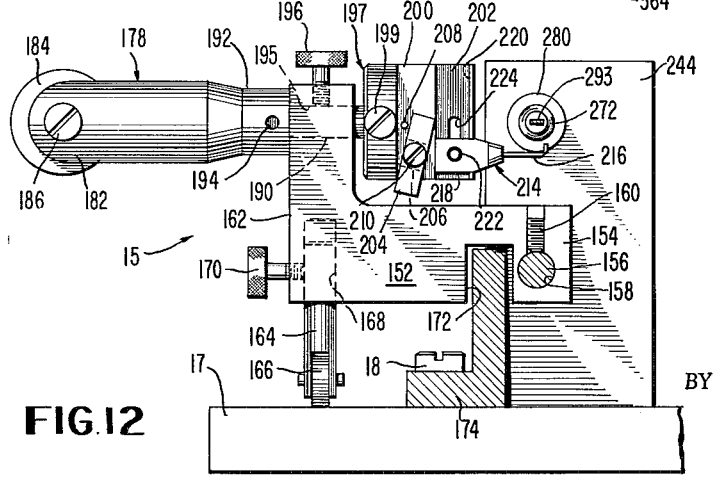
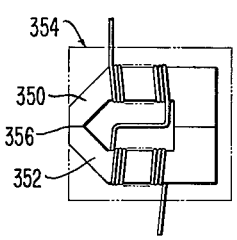
INVENTOR.
HOWARD P. WHITE
BY
Carl Fissell Jr
AGENT United States Patent Office 3,222,000
Patented Dec. 7, 1965

3,222,000
COIL WINDING APPARATUS
Howard P. White, Philadelphia, Pa., assignor to Burroughs Corporation, Detroit, Mich., a corporation of Michigan
Filed May 7, 1962, Ser. No. 192,730
3 Claims. (Cl. 242—9)

This invention relates to coil winding apparatus and more particularly, although not necessarily exclusively, to apparatus for winding electrically conductive coils on irregularly shaped cores.

With still more specificity, the present invention is directed to apparatus for winding so-called lefthand and righthand coils on core forming members which may be of metallic, planar layered, ferrite or thin film dielectric substrate material. In the winding of electrically conductive transformer acting coils on irregularly shaped core supporting members great accuracy is required both as to the total inductance or resistance provided by such coils as well as to the uniformity of distribution of that inductance or resistance as it is wound circumferentially of the core material. This accuracy may be such as to require uniformity of turn spacing of a few thousandths of an inch and a uniformity of coil turns on successive core bodies such that there is a variation from a standard of less than 1%.

It is an object therefore of the present invention to provide new and improved coil winding apparatus.

It is also an object of the present invention to provide apparatus capable of winding accurately and uniformly spaced coils on irregularly shaped core bodies.

Another object of the invention is to provide coil winding apparatus wherein a variable drive operably associated with the work holder permits layer winding of wire in the range of .003 to .0005 of an inch in diameter.

It is an additional object to provide apparatus for winding coils with different sizes of wire and/or with different spacing between adjacent turns of wire.

Another object of the present invention is to provide a coil winding machine capable of conventional layer winding and/or of selectively forming right or left bank windings on a single core body.

In accordance with the foregoing objects the first briefly described, the invention comprises coil winding apparatus wherein a driving assembly is rotatable in a clockwise or counterclockwise direction and carries a demountable wire supply member including a wire coiling or feeding head. Means is operably associated with said driving assembly for moving the feeding head and/or a work piece which may be associated therewith back and forth in opposite directions, parallel to the axis of rotation of said driving assembly thereby to apply winding turns of electrical conductors to the work piece in one direction and/or the opposite direction or back and forth, one layer over the top of the next, as desired.

Additional objects and advantages of the invention will be apparent from the following description when read in conjunction with the accompanying drawings in which:

FIG. 2 is a plan view of the apparatus of FIG. 1;

FIG. 3 is an elevational view of the apparatus of FIG. 1;

FIG. 3A is a detail view along the line 3A—3A of FIG. 3;

FIG. 4 is a greatly enlarged sectional view along the line 4—4 of FIG. 3;

FIG. 5 is a greatly enlarged detail view of a cam and follower mechanism of the present invention;

FIG. 6 is a view similar to FIG. 5 but showing an alternative follower arrangement for the apparatus;

FIG. 7 is a view along the line 7—7 of FIG. 3 illustrating the rail assembly and associated clutches;

FIG. 8 is an enlarged cross sectional view along the line 8—8 of FIG. 3;

FIGS. 9 and 10 are enlarged detail views of the work piece holder of the invention illustrating winding of electrical conductors on irregularly shaped work pieces;

FIG. 11 is a plan view illustrating the work piece and cross slide adjusting mechanism with the wire supply reel holder disposed normal to the axis of the main drive shaft;

FIG. 12 is a view along the line 12—12 of FIG. 11;

FIG. 14 is a view of a coil forming mandrel;

FIG. 15 is a view along the line 15—15 of FIG. 14; and

FIGS. 16 and 17 are views of two different types of electromagnetic transducers fabricated according to the present invention.

Figures 1, 13:
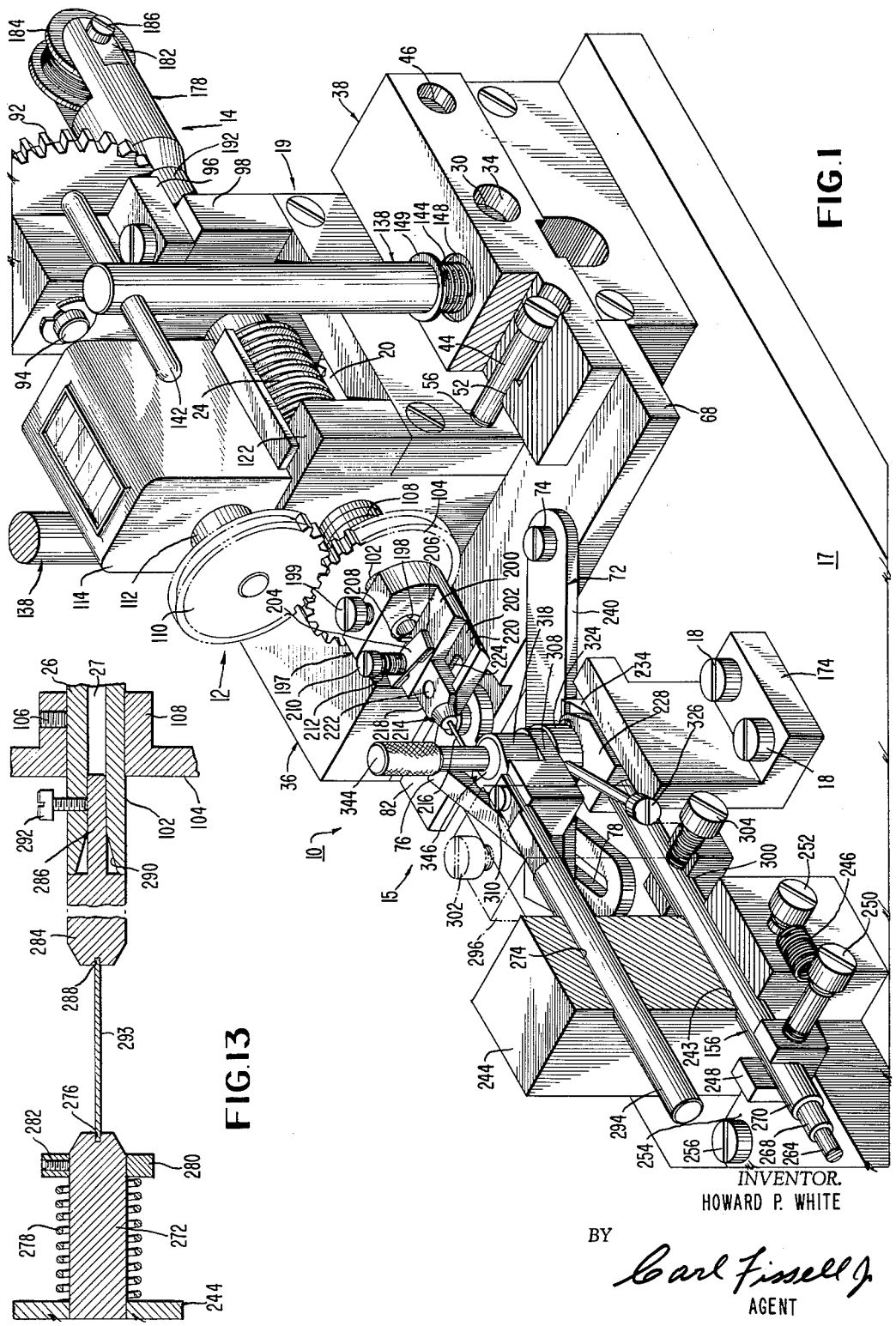
FIG. 1 is an isometric view of a preferred embodiment of the present invention.
FIG. 13 is a view along the line 13—13 of FIG. 11.

Referring first to FIG. 1 of the drawings it is seen that the present invention in its preferred and illustrated embodiment includes a plurality of cooperating assemblies and subassemblies each of which are set forth more or less generally in order to provide a brief overall description of the apparatus. A more detailed description of the apparatus follows hereinafter.

The overall assembly, which hereinafter will be referred to as a coil winder 10, is seen to comprise more or less separable but nevertheless relatively closely, operably associated subassemblies, including a driving unit 12, a demountable conductor feeding and winding or coiling unit 14, a work piece holder 15 and a gauge assembly 16. Each of these subassemblies is disposed on a rigid platform or base member 17 to which they are attached in a conventional fashion, as by bolts 18.

The driving unit 12, FIGS. 1, 2 and 3, comprises a gear box assembly 19 including a large gear 20 disposed on a cross shaft 22 in driving engagement with a worm gear 24 which is pinned to and movable with an elongated central or main drive shaft 26 having a smooth axial bore 27 extending therethrough, as seen most clearly in FIG. 4. Cross shaft 22 is disposed normal to the axis of shaft 26 and is or may be provided with oppositely disposed integral threaded portions, or as in the preferred and illustrated embodiment, FIG. 7, a pair of gears 28 and 30 respectively, may be secured to opposite ends of shaft 22 as by set screws. Gears 28 and 30 are reciprocably, slidably movable through apertures 32 and 34 of right and left hand cross slide blocks 36 and 38 each of which is rectilinearly slidable to and fro on oppositely disposed pairs of parallel shafts 40, 42 and 44 and 46, which are slidably receivable in apertures 48 and 50 and 52 and 54 respectively, in cross slide blocks 36 and 38. The shafts 40, 42, 44 and 46 have their threaded ends 56 secured in threaded apertures 58 on opposite sides of the gear assembly 19. Blocks 36 and 38 together with the shafts 40, 42, 44 and 46 form a rail assembly the purpose of which will be explained hereinafter.

Block 36 is biased towards assembly 19 by means of a spring 60 attached at one of its ends to the shank of a pin 62 in block 36 and at its other end to the shank of a post 64 projecting from assembly 19. Blocks 36 and 38 are joined together to move back and forth as a unitary assembly by means of a rigid tie bar 68 which is or may be attached thereto by a bolt 70, FIG. 3. Tie bar 68 carries a cam bar 72, FIG. 2, mounted thereon by means of a pivot bolt 74 for arcuate pivotal movement relative to this pivot. An L-shaped cam lock bar 76 provided with an elongated slot 78 therein is mounted by means of a pivot bolt 80 to the opposite end of tie bar 68 and is arcuately movable about its mounting pivot in a recess or groove 82 in the bar 68. Cam bar or cross slide member 72 is pivotally, slidably mounted relative to the cam lock bar by means of a bolt 84 received through the end of bar 72 and a slot 78 thereby permitting angular adjustment of the bar 72 relative to the bar 68, etc., for purposes to be explained hereinafter.

The central driving shaft 26 carries a pinion gear 86 at its rightward end (right side of FIG. 3) secured thereto by means of a set screw 88 projecting through the gear hub 90 into engagement with the shaft 26. Pinion gear 86 is in driving engagement with a large drive gear 92 carried by crank shaft 94 journalled in the bearing block 96 secured as by bolts to the upper right edge 98 of the gear box assembly 19. A crank handle 100 attached to or integral with shaft 94 enables the latter to be rotated in a clockwise direction (counterclockwise winding can also be performed) by suitable means, such for example, as by hand.

The opposite end 102 of shaft 26 is provided with a gear 104 secured thereto by means of a set screw 106 through gear hub 108. Gear 104 is in driving engagement with a similar gear 110 secured to the shaft 112 of a counting mechanism 114 by means of a set screw 116 disposed through gear hub 118 on shaft 26. Secured by bolts 120, FIG. 2, to the upper left edge 122 of the gear box 19, counter 114 provides means for indicating the number of rotations of the shaft 26 and thus for indicating the relative number of turns of strand material which are or may be applied to a work piece not here identified. Counter 114 is resettable, e.g., to zero, by means of knurled knob 124 in a conventional manner.

As seen more clearly in FIGS. 7 and 8, each of the cross slide blocks 36 and 38 is provided with a clutch mechanism 126, (upper and lower clutches, FIG. 2) as will now be described. An aperture 128, FIG. 8, is formed in each block 36 and 38 perpendicular to the long dimension of each block and is surrounded by an enlarged concentric recess 130, one side 132, FIG. 7, of which opens into the bore of its respective aperture 32 or 34 of the associated block. A ring gear 134 having an enlarged hub 136 is disposed in each aperture 32 and 34 respectively, in driving engagement with gears 28 and 30 on shaft 22.

An elongated vertically disposed lock bar 138, one for each aperture 128, has a threaded end portion 140 threadedly received in a block member 141 forming a nut therefor and is provided with a handle 142 at its opposite end. Each lock bar carries a tension spring 144 on an undercut portion 146 thereof. Nut 141 is substantially immobilized in groove 147 on the lower side of each block 36 and 38. One end of spring 144 abuts a washer 148 disposed on the upper surface of the gear hub 136 while the opposite end thereof is retained against a washer 149 adjacent a shoulder 150 of each bar 138. By tightening one or the other of the locking bars 138 into the associated threaded block 141 as by rotating their handles in suitable directions, the other untightened or loose locking bar with its associated ring gear is permitted to rotate idly while the tightened gear engages its worm gear on shaft 22 and causes the latter to move thereby effectively moving the rail assembly on its shafts 40, 42, 44 and 46 relative to the gear box 19, for purposes to be explained herein presently.

The strand feeding unit 14 is constructed in a manner so as to provide alternative methods and means for winding strand material on variously shaped work pieces and thus is made to be demountable for disposition intermediate the driving assembly 12 and the work piece holder unit 15 as in FIGS. 11 and 12, or attached to the rightward end of shaft 26 as in FIG. 1.

When the unit 14 is to be disposed in the position as seen in FIGS. 11 and 12, there is provided an L-shaped movable trolley or carrier 152 supported at its forward end 154 for movement (right to left and return, FIG. 11), by means of an elongated shaft 156 journalled intermediate its ends in an aperture 158 in carrier 152 to which the end 154 of the carrier 152 is secured as by the set screw 160. At its rearward end 162, carrier 152 is provided with a demountable pedestal 164 carrying a roller 166 at the bifurcated end thereof. Pedestal 164 is received in an aperture 168 in member 152 and secured therein by means of a thumbscrew 170. The forward end 154 of the carrier 152 is notched as at 172 so as to provide clearance for an L-shaped thrust bracket or block 174 threadedly attached to the base 17 by bolts 18, and prevents axial yawing or bending of shaft 156 as will be explained hereinafter.

A demountable elongated strand supply reel holding member 178 having a hollow axial bore 180, FIG. 4, extending therethrough is provided with a bifurcated end between the confronting parallel projection 182 of which there is adapted to be mounted a strand supply reel 184, demountably secured therebetween by means of the bolt 186 and the nut 188. A hollow extension tube 190, FIG. 12, is slidably receivable in the forward end 192 of member 178 and attached thereto by the set screw 194. Extension tube 190 is receivable in an aperture 195 in the vertically projecting portion of member 152 in which it is adjustably positioned by moving the thumbscrew 196 permitting the member 178 to be used interchangeably, as hereinafter described.

A strand or wire guide block 197 having an aperture 198 therein, FIG. 4, is received on the end of the tubular extension 190, FIG. 12, to which it is demountably secured by means of the set screw 199. In the present illustrated and preferred embodiment, member 197 is provided with two parallel contiguous ledges 200 and 202, one above the other, FIGS. 1, 3 and 12 adjacent the aperture 198. Ledge 200 is provided with a wire tensioning member 204 carrying felt tension pads 206 adhered to the underside thereof as by glue. Member 204 is provided with a strand centering member 208 for centering the wire relative to the axis of the bore 27. The tensioning member 204 is adjustable relative to aperture 198 by means of the thumbscrew 210 and the spring 212.

A substantially conically shaped wire guide member 214 is seen to include a projecting L-shaped tubular needle-like extension 216. The rightward thickened end (FIGS. 1, 2 and 3) of guide 214 is provided with a rectangular slide or shoe member 218 slidably receivable in a groove or channel 220 in ledge 202. A bolt 222 extending through an elongated slot 224 in ledge 202 and threadedly attached to guide 214 permits the latter to be adjustably positionable transversely of the block 197.

A strand of wire 226, FIG. 4, extending away from supply spool or reel 184 now may be fed therefrom through the bore 180 of the member 178 thence through the tubular extension 190 (if used) or if not, then through the bore 27 of shaft 26, through the aperture 198 of guide block 197, under the pads 206 and out through the bore of the extension 216 for winding application as hereinafter set forth.

It is to be noted at this point, and, as was briefly referred to hereinbefore, the strand supply holder 178 can be mounted to the end of the shaft 26, as illustrated in FIGS. 1 to 4 inclusive, by backing off set screw 194, withdrawing or cutting wire 226, demounting the wire guide block 196, removing the extension tube 190 and thereafter coupling the holder 178 to the shaft 26 in abutting relationship with pinion gear 86, FIG. 3, and finally, tightening the set screw 194 thereon. The reasons for the change around will become more clear as the description proceeds.

Turning now to the work piece holder 15, the rightward end of shaft 156 (FIGS. 1, 2 and 3 and 11) is seen to include a demountable cam block 228 secured thereto by means of a set screw 230, FIGS. 5 and 6. The tapered forwardly projecting end 232 of block 228 is bifurcated and carries a cam follower or shoe slide 234 pivotally mounted to the bifurcated end thereof by means of a bolt 236 and nut 237, FIG. 3. The forwardly projecting face portion 238, FIGS. 5 and 11, of slide 234 is adapted to be pressed into sliding contact with the edge 240 of the cam bar 72 so as to ride or glide therealong as the rail assembly moves back and forth carrying the cam bar therewith as hereinafter described.

A slightly modified form of follower is seen in FIG. 6 to comprise a roller 242 likewise secured to the bifurcated end of the cam block 228 as by the means beforementioned.

The leftward end of shaft 156, FIGS. 2, 3 and 11 is slidably supported for rectilinear movement (rightwardly-leftwardly in these views) in an aperture 243 in a vertically disposed guide block 244 secured to the base 17 as by bolts 18. A spring 246 secured at one end to an adjustable collar 248 attached to shaft 156 by means of bolt 250 and at its other end to a bolt 252 in the block 244, biases the shaft 156 and thus the shoe 234 or roller 242 against the cam bar 72.

An indicator bracket 254, attached as by bolts 256 to frame 17 extends away therefrom, leftwardly, FIGS. 2, 3, and 11, and supports guage assembly 16 including an indicating guage such as a micrometer 258 having a scale 260 and an indicating needle or pointer 262 actuated by a plunger shaft 264. The guage is adjustably mounted on the support 154 by means of the thumbscrew 266 threadedly engageable with the threaded bores of holes 267 so as to bring the plunger tip 268 into contact with the left end 270 of shaft 156. Rectilinear movement of shaft 156 can thus be calibrated and indicated on the scale 260 on guage 258.

A modified form of work piece holding apparatus is illustrated in FIG. 13, wherein the guide block 244 is provided with a short stub shaft 272 slidable in an aperture 274 disposed adjacent and parallel but slightly above aperture 243 and has a work piece receiving slot 276 in the rightward end thereof. A tensioning spring 278 is or may be employed and is adjustably disposed on shaft 272 intermediate the block 244 and a collar 280 attached to the end of shaft 272 by set screw 282. An auxiliary shaft 284 provided with a reduced mounting portion 286 at one end and a work piece receiving slot 288 at the other end may have the portion 286 introduced into the funnel-shaped end 290 of shaft 26 to be supported therein by means of the set screw 292. A work piece such, for example, as the thin film substrate member 293 or the coil mandrel 358, FIG. 14, hereinafter referred to may thus be supported for application thereto of strand material 226 hereinafter described.

Still another and different work piece supporting apparatus is seen in FIGS. 1, 2 and 3 to comprise an elongated tie bar shaft 294 which is slidably disposed through aperture 274 in block 244. A rigid block 296, provided with upper and lower apertures 298 and 300 respectively, is employed to rigidify the assembly and is attached to shafts 156 and 294 as by thumbscrews 302 and 304 respectively. The under-cut or reduced forward end 306 of the bar 294 carries a substantially L-shaped index block 308 adjustably secured thereto as by screw 310. Block 308 is provided with a radial cut out 312, FIGS. 9 and 10, adjacent a lower forwardly projecting arm portion 314, FIGS. 1 and 3, for purposes to be explained presently.

A work piece holder 316 is seen in FIGS. 3A, 9 and 10 to include an enlarged body portion 318 integral with a narrow elongated shank 320, the latter being demountably receivable in an aperture 322 in the projecting end 314 within which it is retained by means of a collar 324 carrying a demountable index arm 326 threadedly engageable with the shank 320. A pair of shallow conical recesses or depressions 328-328', FIGS. 9 and 10, are formed in a radial wall surface 330 of the elongated upper body portion 318 of member 316. The radius of curvature of wall surface 330 is substantially identical to that of the surface 312. As clearly seen in FIGS. 9 and 10, block 308 is provided with a threaded bore 332 opening inwardly from the radial surface 312 and substantially normal to block 296 into which there is threadedly received a demountable holder member 333 including a ball detent 334 biased by spring 336 into operative engagement with one of the recesses 328-328' of the work piece holder 316.

The upper flat surface 338 of the workpiece holder 316 is milled or otherwise provided with a 90° section cut out forming two sides 340 and 342 therein, disposed at right angles to one another and of a suitable dimension, e.g., depth, length, etc. to receive a desired workpiece. A clamp 344, FIGS. 1 and 3A, carrying a clamp washer 346 is threadedly receivable in the threaded bore 348 of the work piece holder 316 so as to effectively clamp work pieces such for example as the core members 350 and 352, FIGS. 9 and 10, in respective grooves 340 and 342 therein.

One aspect of the invention is the capability of the winder 10 to apply conductive strand material to irregularly shaped core members easily and quickly and efficiently to layer wind wire of a diameter, e.g., from .003 to .0005 while maintaining maximum control over the apparatus. An electromagnetic transducer 354, FIG. 16, may include a pair of oppositely disposed core members 350-352 wound as set forth hereinafter, by the winder 10 and disposed in confronting abutting relationship thereby providing an operating head gap 356. Two or more of such transducers may be insulatingly stacked together to form a stack or stick and thereafter potted into a unitary assembly.

In FIG. 14 there is seen a coil mandrel 358 having a slight taper from left to right, as shown, and a substantially rectangular cross section as seen at 360 in the end view of FIG. 15. The mandrel 358 is or may be substituted for the core member 293 shown in FIG. 11 and thereafter provided with a single turn or wrap of dielectric material 362 such for example, as "Mylar" around which a desired number of turns of wire 226 are then wound. The ends 364 of the wire coil 366 thus formed are temporarily immobilized, e.g., by means of a small dab of glue. Thereafter the coil 366 is slipped easily off the mandrel rightwardly, FIG. 14 and then slid onto the leg 368 of a transducer core member 370 which is of substantially rectangular cross section thereby providing an energizing read-record winding for this member. By the foregoing relatively efficient and simple means one or both legs of the member 370 may be provided with electrical windings or coils as required. Two or more transducer core members 370 may be insulatingly attached together in parallel side by side arrangement with their air gaps 372 aligned to form a stack and thereafter potted in suitable dielectric material.

In certain applications where space is critical the core members 370 may be arranged with the coils 366 on alternate sides of the stack. One such transducer assembly fabricated by the present apparatus included coils 366 approximately ⅜ of an inch long wound of one mil wire and alternately stacked left and right with respect to the axis of the aligned gaps 372 thirteen mils center to center therealong.

Assuming that it is desired to apply strand material e.g., .006 to .0009 insulated wire, to a work piece of the type shown in FIGS. 9 and 10, the winding unit is disposed as shown in FIGS. 1, 2, 3 and 4, with the work piece holder 15 located in the block 244, as earlier described herein. Wire 226 is fed through the member 216 and a sufficient length is exposed for easy handling in starting the winding operation. Cam bar 72 is angularly adjusted for the size wire being used and is fixed in the selected position relative to the shoe slider 234 by means of the bolt 84 and slot 78.

The thumbscrew clamp 344 is unscrewed slightly permitting a pair of core members 350 and 352 to be slid into the grooves 340 and 342 respectively after which the clamp 344 is tightened clamping the members 350 and 352 therebetween in the relative positions shown in FIGS. 9 and 10. The index arm 326 is rotated leftwardly to the position of FIG. 9. The gauge 258 and the counter 114 are adjusted to zero. Handle 142 (lower handle in FIG. 2) of the member 138 is rotated clockwise to immobilize gear 134 relative to gear 30 so that the work piece holder 15 is movable rightwardly in the direction of the horizontal arrow FIG. 9, while the rail assembly moves in the direction of the vertical arrow therein. The leading end of wire 226 may be held by hand while handle 100 is rotated, generally clockwise, in the manner earlier described so as to apply winding turns of wire 226 to the core member 352.

After the desired number of windings of conductor 226 has been applied to the core member 352 the winding operation is halted while the index arm is turned counter-clockwise (to the right) to the relative position shown in FIG. 10.

The counter 114 and gauge 258 may once again be adjusted to zero or the operator may note the indicated count standing in counter 114 and the setting of gauge 258. Thereafter winding turns of wire can be applied to the core 350 until these references, counts and/or points are reached or indicated. In either event, the clutch handle 142 of the upper member 138 FIG. 2, is now tightened while the lower clutch handle is loosened permitting the work piece holder 15 to advance (to the left) in the direction of the horizontal arrow FIG. 10, while the rail assembly moves in the direction of the vertical arrows therein. The winding operation is now resumed and winding turns of wire 226 are applied to the core member 350 as shown. This clutch arrangement as hereindescribed eliminates back lash or lost motion as the winder rail assembly moves from a terminal position in one direction to a new position in the opposite direction.

Upon completion of the wire winding operation the core members 350 and 352 may be joined together and assembled with other similar members in the arrangements shown in FIG. 6 to form an electromagnetic transducer 354 as earlier described. Stacks of transducers may be easily and simply fabricated by potting a plurality of such units 354 together into a unitary assembly or stick (not shown) in a manner well known.

In the production of thin film memory apparatus, for example, it is often desirable to apply electrically conductive windings to thin film substrates similar in configuration to the member 293 in FIGS. 11–13. For this operation the demountable member 14 is or may be physically oriented or seen in FIGS. 11 and 12, with the work piece holder illustrated in FIG. 13 substituted for assembly 15, FIG. 1. The cam bar 72 is or may be adjusted depending on the wire size employed and the guage 258 and counter 114 once again zeroized. Rotation of the crank 100 now rotates the work piece drawing the previously attached wire 226 around the work piece thereby applying multiple turns or wraps to the member 293.

There has thus been described a novel coil winder which is easily portable, capable of layer winding relatively small diameter wire on variously shaped core bodies, and is simply and easily adaptable to varying types of winding apparatus.

What is claimed is:
1. Coil winding apparatus comprising:
  (a) a demountable workpiece holder,
  (b) means for mounting said holder in a predetermined position relative to said apparatus,
  (c) a mounting block operably associated with said workpiece holder, said mounting block including an elongated projection member,
  (d) a supporting pedestal detachably mounted on said projecting member and means operably associated therewith permitting said workpiece to be angularly adjustably positioned relative to said drive means,
  (e) a demountable supply of strand material arranged for applying wire strands to said workpiece,
  (f) drive means for causing relative movement of said supply of strand material with respect to said workpiece,
  (g) demountable means for guiding said strand material from said supply to said workpiece,
  (h) means for causing relative movement between said supply and said workpiece in a direction substantially parallel to the axis of rotation of said workpiece, said last means including a cross slide adjustable for changing the pitch spacing between adjacent turns of said strand material,
  (i) a follower member engageable with said last member and movable thereby in either of two opposite directions for distributing said strand material over said workpiece,
  (j) means for adjusting the angular orientation of said cross slide relative to said drive means and said follower,
  (k) means for rotating said drive means whereby relative movement between said slidable member and said follower member relative to said strand supply means and said workpiece causes winding turns of strand material to be withdrawn from said supply and distributively applied to said workpiece as said drive means is rotated,
  (l) an indexable counter operably coupled to said drive means for indicating the number of rotations of said drive means, and
  (m) individual, selectively, alternately, engaged controllable clutch members disposed on opposite sides of said apparatus and including means engageable with said drive means effective to change the direction of movement of said follower relative to said slidable member thereby causing said strand material to be applied to said workpiece in either of two opposite transverse directions.
2. Coil winding apparatus comprising:
  (a) a demountable workpiece holder,
  (b) means mounting said holder in a predetermined position relative to said winding apparatus,
  (c) a demountable supply of strand material arranged for applying wire strands to a workpiece,
  (d) drive means for rotating said supply of strand material with respect to said workpiece,
  (e) demountable means for guiding said strand material from said supply to said workpiece,
  (f) means for causing relative movement between said supply and said workpiece in a direction substantially parallel to the axis of rotation of said workpiece, said last means including an angularly disposed slidable member adjustable for changing the pitch spacing between adjacent turns of said strand material,
  (g) a follower member engageable with said last member and movable thereby in either of two opposite directions for distributing said strand material over said workpiece,
  (h) means for adjusting the angular orientation of said slidable member relative to said drive means and said follower,
  (i) means for rotating said drive means whereby relative movement between said slidable member and said follower member relative to said strand supply means and said workpiece causes winding turns of strand material to be withdrawn from said supply and distributively applied to said workpiece as said drive means is rotated,
  (j) individual, selectively, alternately, engaged, controllable clutch members disposed on opposite sides of said apparatus and including means engageable with said drive means effective to change the direction of movement of said follower relative to said slidable member thereby causing said strand material to be applied to said workpiece in either of two opposite transverse directions.

3. Coil winding apparatus comprising:
(a) a demountable workpiece holder,
(b) means for mounting said holder in a predetermined position relative to said apparatus,
(c) a demountable supply of strand material for application to a workpiece carried by said holder,
(d) drive means for causing relative movement of said supply of strand material with respect to said workpiece,
(e) demountable means for guiding said strand material from said supply to said workpiece including a rigid block having a shallow aperture in one portion thereof providing mounting means therefor, and a shallow groove adjacent one edge of said block,
(f) a tubular strand guide adjustably, slidably received in said groove, and a tension supplying member adjustably positioned in the pathway of said strand material,
(g) means for causing relative movement between said supply and said workpiece in a direction substantially parallel to the axis of rotation of said workpiece, said last means including a cross slide adjustable for changing the pitch spacing between adjacent turns of said strand material,
(h) a follower member engageable with said cross slide and movable thereby in either of two opposite directions for distributing said strand material over said workpiece,
(i) means for adjusting the angular orientation of said cross slide relative to said drive means and said follower,
(j) means for rotating said drive means whereby relative movement between said cross slide and said follower member relative to said strand supply means and said workpiece causes winding turns of strand material to be withdrawn from said supply and distributively applied to said workpiece as said drive means is rotated,
(k) an indexable counter operably coupled to said drive means for indicating the number of rotations of said drive means, and
(l) individual, selectively, alternately engaged controllable clutch members disposed on opposite sides in said apparatus and including means engageable with said drive means effective to change the direction of movement of said follower relative to said slidable member thereby causing said strand material to be applied to said workpiece in either of two opposite transverse directions.

References Cited by the Examiner
UNITED STATES PATENTS

| | | | |
|---|---|---|---|
| 1,607,242 | 11/1926 | De Bold | 242—7 |
| 2,180,207 | 11/1939 | Jacob | 242—9 |
| 2,375,861 | 5/1945 | Martin et al. | 242—7 |
| 2,426,522 | 8/1947 | Porter. | |
| 2,509,073 | 5/1950 | Raetsch | 242—9 |
| 2,590,246 | 3/1952 | Heckman et al. | 242—7 |
| 2,632,603 | 3/1953 | Hunsdorf | 242—13 |
| 2,739,371 | 3/1956 | Grisdale et al. | |
| 2,757,884 | 8/1956 | Bryant et al. | 242—158 |
| 2,964,971 | 12/1960 | Blydenburgh | 242—158.5 |
| 3,106,351 | 10/1963 | Fulton | 242—9 |
| 3,128,956 | 4/1964 | Schumann | 242—158.4 X |

MERVIN STEIN, *Primary Examiner.*
JOSEPH P. STRIZAK, *Examiner.*